Jan. 13, 1948.  C. V. FIELDS  2,434,554
TERMINAL BUSHING SEAL
Filed Aug. 22, 1946

WITNESSES:
E. A. McCloskey
Rev. C. Groome

INVENTOR
Charles V. Fields.
BY
James N. Ely
ATTORNEY

Patented Jan. 13, 1948

2,434,554

UNITED STATES PATENT OFFICE 2,434,554

TERMINAL BUSHING SEAL

Charles V. Fields, Pittsburgh, Pa., assignor to Westinghouse Electric Corporation, East Pittsburgh, Pa., a corporation of Pennsylvania Application August 22, 1946, Serial No. 692,330

7 Claims. (Cl. 174—152)

This invention relates to sealed electrical apparatus and, in particular, to sealed apparatus having an enclosing case fabricated from aluminum or aluminum alloys.

Capacitors, transformers, and the like, are constructed and embodied in sealed cases having hermetically sealed bushings extending therethrough. Recently, it has become desirable to construct certain cases of aluminum or aluminum alloys, especially where high-frequency currents are utilized in connection with the apparatus. Further, aluminum and aluminum alloys are sometimes easier to fabricate than the metals employed heretofore for the cases.

It has been found to be difficult to produce satisfactory solder seals between the aluminum case and the bushings extending therethrough. This is true for all known soft-solder seals with aluminum for, while the seal appears to be leak-proof when first made and put into use, it is found that in time the moisture in the atmosphere will corrode the solder-aluminum joint to such an extent that the seal fails. In certain known instances, the prior art seals to aluminum have failed to the extent that the bushing has fallen off the aluminum case.

An object of this invention is to provide an electrical apparatus having an aluminum case with permanent hermetically sealed bushings therein.

Another object of this invention is to provide for protecting solder seals to the aluminum case enclosing electrical apparatus.

A further object of this invention is to provide a solder seal to the aluminum case of electrical apparatus while protecting the metallic seal from the atmosphere external of the case.

Figure 1:
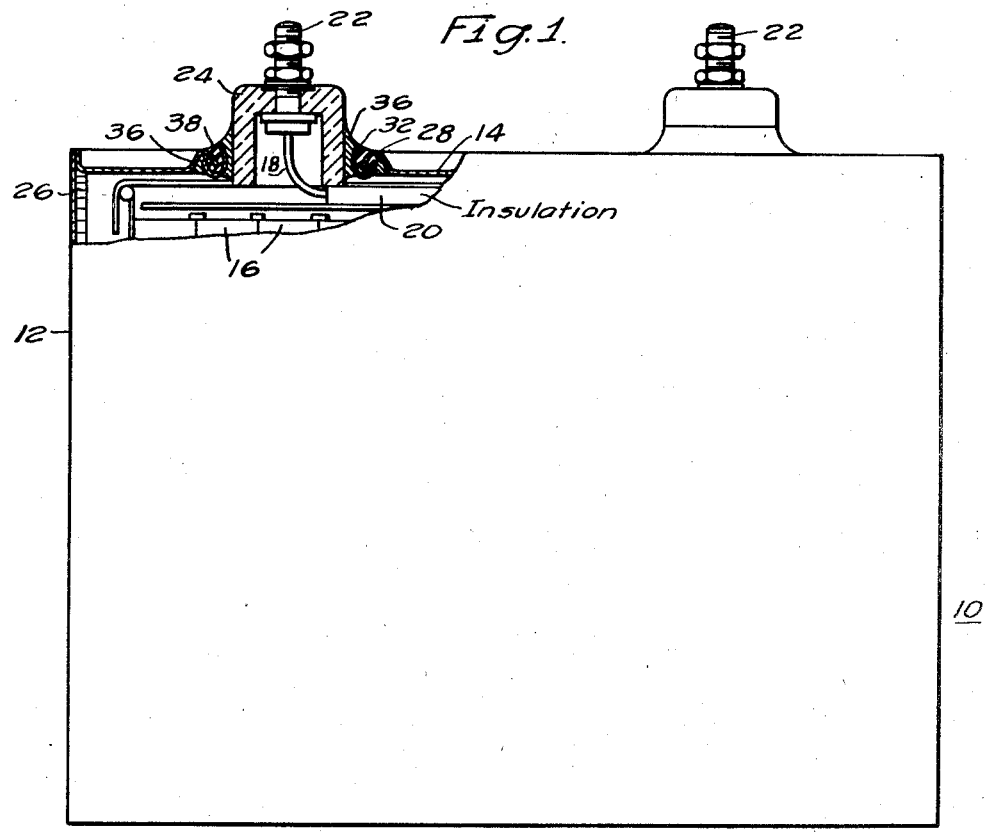
Figure 2:
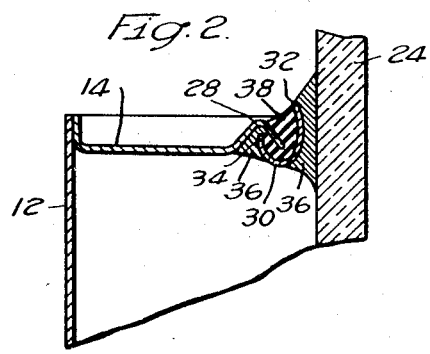

Other objects of this invention will become apparent from the following description, when taken in conjunction with the accompanying drawing, in which:

Figure 1 is a view in elevation, and partly in section, of a capacitor which embodies the teachings of this invention; and Fig. 2 is a view in section, and greatly enlarged, of the seal between the bushing and the case of the apparatus illustrated in Fig. 1.

Referring to the drawing, this invention is illustrated by reference to a capacitor 10. The capacitor is provided with a metal tank 12 having a cover 14 therefor, both components being fabricated from aluminum or aluminum alloy. The joints of the tank 12 and the cover 14 are of the usual welded construction.

The capacitor 10 comprises a plurality of individual capacitor sections or windings 16 disposed in a stack within the case formed of the tank 12 and cover 14, being suitably insulated from the case by any of the assembly methods which are well known in the art. A desirable construction of the stack of capacitor sections 16 and the mounting therefor in the tank 12 is shown and described in application Serial No. 518,210, filed January 14, 1944, in the name of R. E. Marbury, and assigned to the assignee of this invention. The capacitor sections 16 are disposed to be connected to an external circuit (not shown) by means of control leads 18 disposed in insulating tubes 20 of fiber or the like, the leads 18 being connected to terminal studs 22 which extend through bushings 24 sealed in the cover 14 of the case in a manner to be described hereinafter. As illustrated, the case is filled with a suitable dielectric medium 26 to impregnate the sections 16 and insulate the windings and leads from the case.

Referring to Fig. 2, the details of the joint between the bushing 24 and the cover 14 of the case are clearly shown. In practice, the bushing 24 is of the ceramic type, known to the trade as a porcelain bushing having a platinum glaze thereon to facilitate the bonding of metal to the bushing. The method of producing the platinum glaze on porcelain bushings is well known and is described and claimed in Letters Patent 1,852,093, which issued April 5, 1932, to L. Smede et al. Preferably, the platinum glazed bushing 24 is "tinned," as described in the Smede et al. patent, preparatory to the making of a bond with a suitable soft-solder.

In the embodiment illustrated, the edge of the aluminum cover 14 which forms the opening for receiving the bushing 24, is bent or so distorted as to form an inverted V-shaped ring 28 about the periphery of the opening. In such construction, the free end of the V-ring 28 extends in a direction toward the inside of the case. Adjacent the bushing, but in spaced relation thereto, a ring 30 of metal, such as brass or other non-magnetic material, and which has a body which is substantially U-shape in cross-section, is so disposed that one leg 32 of the ring 30 extends outwardly from the case through the opening formed between the free edge of the V-ring 28 and the bushing 24; whereas, the other leg 34 extends in interlocking relation with the inverted V-ring 28 terminating closely adjacent to the apex of the ring.

As the internal surface of the aluminum V-ring 28 opposite the outer surface of the leg 34 of ring 30 is readily "tinned," a solder seal can be readily effected between the aluminum V-ring 28 and the outer surface of the leg 34 of the ring 30. Any suitable soft solder such as lead-tin or zinc-tin solders may be utilized in forming the seal 36 between these surfaces, as well as between the external surface of the leg 32 of the ring 30 and the "tinned" surface of the porcelain bushing 24 carrying the platinum glaze thereon. In making the solder seal to the aluminum case, the aluminum is "tinned" and a flux is employed. A suitable flux is disclosed in Patents 2,238,068 and 2,286,298 issued to M. A. Miller. Thus, a metal-to-metal seal is effected throughout the joint from the aluminum case to the platinum glaze of the porcelain bushing 24.

Although the joint described hereinbefore is strong and, as initially made, is an effective seal, in order to protect the seal between the solder and the aluminum case formed within the confines of the V-ring 28, the cavity of the substantially U-shaped ring 30 is filled with a suitable sealing compound 38 in a manner to envelop the free edge of the inverted V-ring 28 and to thereby effectively seal the solder-aluminum joint from attack by moisture in the external atmosphere.

Many sealing compounds are known which are satisfactory for protecting the solder-aluminum seal, but one sealing compound which has been found to be very effective for this purpose is that known as the reaction product of the acid half ester of castor oil and maleic anhydride, and monostyrene. Such sealing compound is thermosetting, being formed of a completely polymerizable material which will not evolve solvents. Specific information as to the composition of this particular sealing compound may be found in the copending applications Serial No. 694,127, filed August 30, 1946, and Serial No. 529,173, filed April 1, 1944, in the name of N. C. Foster. Other suitable sealing compounds formed of alkyd resins and monostyrene are also available on the market, being suitable for sealing the cavity of the ring 30.

The seals utilized in forming the joints between the members, as described hereinbefore, are effective for maintaining the case of the electrical apparatus hermetically sealed, it being noted that the solder-aluminum seal is only exposed to the hermetically sealed dielectric medium within the enclosing case. Further, where a thermosetting material is employed for filling the cavity of the ring 30, it is found that the joint between the bushing and the aluminum case is permanent in that the sealing compound is not readily removed from the cavity, with the result that the solder seal is not easily damaged nor is it exposed to the atmosphere.

While this invention has been described with reference to a capacitor, it is, of course, to be appreciated that such reference is made only for the purpose of illustrating the invention. The sealed case described can be utilized in connection with any electrical apparatus wherein it is required to enclose the electrical apparatus in a hermetically sealed aluminum case which is filled with a dielectric medium. Further, while specific reference has been made to the metal of the case as being aluminum, it is, of course, to be appreciated that aluminum alloys may be used in place of aluminum; and, where the term "aluminum" is used in the attached claims, it is to be given the broad interpretation as covering both aluminum and aluminum alloys.

I claim as my invention:

1. In an electrical apparatus, the combination comprising, a case of aluminum for enclosing the electrical apparatus, the case having an opening therein, a bushing disposed to extend through the opening, a ring of metal having a cross section of substantially U-shape carried by the bushing and disposed in the opening to receive the edge of the case forming the opening, a seal of soft-solder disposed between the ring and the edge of the aluminum case forming the opening, and a non-metallic sealing compound disposed within the body of the U-shaped ring to cover the solder seal externally of the case to seal the solder seal from the atmosphere externally of the case.

2. In an electrical apparatus, the combination comprising, a case of aluminum for enclosing the electrical apparatus, the case having an opening therein, a bushing disposed to extend through the opening, a ring of metal having a cross section of substantially U-shape carried by the bushing and disposed in the opening to receive the edge of the case forming the opening, a seal of soft-solder disposed between the ring and the edge of the aluminum case forming the opening, and a non-metallic thermostat sealing compound disposed within the body of the U-shaped ring to cover the exposed surface of the solder seal between the ring and the aluminum case externally of the case to protect the solder seal from the atmosphere externally of the case.

3. In an electrical apparatus, the combination comprising, a case of aluminum for enclosing the electrical apparatus, the case having an opening therein, a bushing of ceramic material disposed to extend through the opening, a ring of metal having a cross-section of substantially U-shape disposed in the opening about the bushing to receive the edge of the case forming the opening, joints of solder disposed between the case and the ring and between the ring and the bushing to effect seals therebetween, and a non-metallic sealing compound disposed within the body of the U-shaped ring member to substantially fill the ring and envelop the edge of the metal case extending therein to thereby seal the solder joint to the aluminum case from the atmosphere.

4. In an electrical apparatus, the combination comprising, a case of aluminum for enclosing the electrical apparatus, the case having an opening therein, the edge of the case forming the opening being bent to extend in a direction toward the inside of the case, a bushing of ceramic material disposed to extend through the opening, a ring of metal having a body substantially U-shaped in cross-section disposed in the opening about the bushing to receive the bent edge of the case opening within the U-shaped body of the ring, joints of solder disposed between the case and the ring and between the ring and the bushing to effect seals therebetween, and a non-metallic sealing compound disposed within the body of the U-shaped ring member to substantially fill the ring and envelop the edge of the metal case extending therein to thereby seal the solder joint to the aluminum case from the atmosphere.

5. In an electrical apparatus, the combination comprising, a case of aluminum for enclosing the electrical apparatus, the case having an opening therein, the edge of the case forming the opening being bent to extend in a direction toward the inside of the case, a bushing of ceramic material disposed to extend through the opening, a ring of metal having a body substantially U-shaped in cross-section disposed with one leg of the body in the opening about the bushing thereby to receive the bent edge of the case opening within the U-shaped body of the ring, solder seals disposed between the outer surface of the one leg of the ring body and the bushing and between the outer surface of the other leg of the ring body and the aluminum case, and a non-metallic sealing compound disposed within the U-shaped ring body to substantially fill the ring body and envelop the edge of the metal case therein to thereby protect the solder seal to the aluminum case from the atmosphere.

6. In an electrical apparatus, the combination comprising, a case of aluminum for enclosing the electrical apparatus, a dielectric medium within the case for insulating the electrical apparatus, the case having an opening therein, the edge of the case forming the opening being distorted to provide an inverted V-ring about the opening, a bushing of ceramic material disposed to extend through the opening, a ring of non-magnetic metal having a body substantially U-shaped in cross-section disposed in spaced relation about the bushing to interlock with the inverted V-ring forming the edge of the opening, solder seals disposed between the inner surface of the inverted aluminum V-ring and the interlocked leg of the U-shaped ring and between the other leg of the U-shaped ring and the bushing, and a non-metallic sealing compound disposed within the U-shaped ring to substantially fill the ring body and envelop the interlocked leg of the inverted V-ring, the solder seal between the aluminum case and the U-shaped ring being thereby sealed from the atmosphere and exposed only to the dielectric medium within the sealed case.

7. In a sealed joint between an aluminum case and a ceramic bushing disposed in an opening in the case, the combination comprising, a ring member of non-magnetic metal having a body substantially U-shaped in cross-section disposed in spaced relation about the bushing with one leg of the U-shaped body extending through the opening in a direction outwardly of the case and the other leg terminating adjacent the case internally thereof for receiving the edge of the case forming the opening between the legs, solder seals disposed between the aluminum case and the other leg of the ring and between the one leg of the ring and the bushing, and a non-metallic sealing compound disposed within the body of the U-shaped ring to substantially fill the ring body and envelop the edge of the case forming the opening to protect the solder seal to the aluminum case from the atmosphere externally of the case.

CHARLES V. FIELDS.

REFERENCES CITED

The following references are of record in the file of this patent:

UNITED STATES PATENTS

| Number | Name | Date |
| --- | --- | --- |
| 2,266,523 | Waterman | Dec. 16, 1941 |
| 2,399,103 | Clinedinst | Apr. 23, 1946 |
| 1,223,777 | Eby | Apr. 24, 1917 |
| 2,332,454 | Martin | Oct. 19, 1943 |

OTHER REFERENCES

Circular of the Bureau of Standards (Dept. of Commerce), No. 78, issued January 28, 1919. (A copy in Div. 14.)